UNITED STATES PATENT OFFICE.

FREDERICK B. SANFORD, OF DOTHAN, OREGON.

PROCESS FOR RECOVERING GOLD FROM CONCENTRATES.

1,176,858.  Specification of Letters Patent.  Patented Mar. 28, 1916.

No Drawing. Application filed January 10, 1913, Serial No. 741,314. Renewed February 17, 1916. Serial No. 78,967.

*To all whom it may concern:*

Be it known that I, FREDERICK B. SANFORD, a citizen of the United States, residing at Dothan, in the county of Douglas and State of Oregon, have invented new and useful Improvements in Processes for Recovering Gold from Concentrates, of which the following is a specification.

My invention relates to an improved process for recovering gold in concentrate from placer mines.

The invention aims to provide a means whereby the gold in the concentrate from placer mines may be readily and rapidly recovered at minimum expense.

In the compound or solution the following ingredients in the proportion stated are employed: ammonium chlorid 1 oz., water 72 oz., sodium phosphate 4 oz.

When the solution is prepared, the ammonium chlorid and twenty-four ounces of the water is stirred or agitated as a mixture, effecting thorough dissolution of the chlorid in the water. The sodium phosphate and remainder of the water, namely forty-eight ounces, is then stirred or agitated as a mixture, effecting complete dissolution of the phosphate. Thereupon the sodium solution is effectively stirred or agitated while in a suitable vessel, and while the agitation or stirring continues, the ammonium solution is slowly and gradually added thereto, entering into solution therewith, forming the final solution.

The proportions stated above are to be understood as being by way of example merely, as the same can be varied and the solution still act effectively.

Recovery of the gold in practice is as follows: The concentrate from placer mines is preferably reduced to the desired fineness by grinding or trituration. Such concentrate in a ground condition while contained in a suitable vessel is heated in any preferred manner. While thus heated a sufficient quantity of the final solution is added thereto to completely cover the same. The temperature of this mixture of the heated concentrate and solution, should be about 115° F. At this temperature the solution so alters the coating of the grains of gold that the coating material may readily be removed by agitation upon amalgamation.

Having thus described my said invention what I claim as new and desire to secure by Letters Patent is:—

1. The process of recovering gold consisting in subjecting gold-containing concentrate to the action of an agent to alter the coating of the concentrate for removal by agitation upon amalgamation, consisting of a solution having ammonium chlorid and sodium phosphate therein.

2. The process of recovering gold consisting in subjecting gold-containing concentrate at a temperature of about 115° F. to the action of an agent at the same temperature, and thoroughly agitating the concentrate in the said agent to alter the coating of the concentrate for removal by agitation upon amalgamation, said agent being a solution of ammonium chlorid, sodium of phosphate and water.

FREDERICK B. SANFORD.

Witnesses:
 A. E. WHEELER,
 W. WILLIAMS.

Copies of this patent may be obtained for five cents each, by addressing the "Commissioner of Patents, Washington, D. C."